US006983478B1

(12) United States Patent
Grauch et al.

(10) Patent No.: US 6,983,478 B1
(45) Date of Patent: Jan. 3, 2006

(54) METHOD AND SYSTEM FOR TRACKING NETWORK USE

(75) Inventors: Edward Rowland Grauch, Atlanta, GA (US); John Christopher Batten, San Jose, CA (US); Fred Thomas Danner, III, Colo. SP., CO (US); Scott R. Swix, Duluth, GA (US); John R. Stefanik, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/496,825

(22) Filed: Feb. 1, 2000

Related U.S. Application Data

(63) Continuation of application No. 08/799,306, filed on Jan. 6, 1997, now abandoned.

(51) Int. Cl.
*H04H 9/00* (2006.01)
*H04N 7/173* (2006.01)

(52) U.S. Cl. .................... 725/13; 725/114; 725/131

(58) Field of Classification Search .................. 725/9, 725/14, 16, 21, 46, 58, 61, 13
See application file for complete search history.

(56) References Cited

U.S. PATENT DOCUMENTS

| 677,209 A | 6/1901 | Chemock et al. |
|---|---|---|
| 3,798,610 A | 3/1974 | Bliss et al. |
| 3,886,302 A | 5/1975 | Kosco |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,556,030 A | 12/1985 | Aono |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |
| 4,697,208 A | 9/1987 | Kiewit et al. |
| 4,697,209 A * | 9/1987 | Kiewit et al. .................. 725/19 |
| 4,698,670 A | 10/1987 | Matty |

(Continued)

FOREIGN PATENT DOCUMENTS

EP         0 424 648 A       2/1991

(Continued)

OTHER PUBLICATIONS

PCT Publication No. WO 94/17609 (Kiefi et al., Aug. 4, 1994).

(Continued)

*Primary Examiner*—Vivek Srivastava
*Assistant Examiner*—Joseph G. Ustaris
(74) *Attorney, Agent, or Firm*—Bambi F. Walters; Walters & Zimmerman

(57) ABSTRACT

An interactive media delivery system enables interactive media programming to a multimedia device and also tracks a subscriber's use of the multimedia device. For example, the device tracks events, such as a change in programming, a change in channel selection, and/or the subscriber's interaction with a particular interactive services application. Each event may be stored as an event record in a database, and one or more of the event records may be merged with content data to form event timelines of programming or other activity to the multimedia device over a selected time period. Further, timelines may be analyzed to generate ratings and other information about programming and may also be correlated with demographics data for marketing analysis.

16 Claims, 9 Drawing Sheets

U.S. PATENT DOCUMENTS

| | | |
|---|---|---|
| 4,720,873 A | 1/1988 | Goodman et al. |
| 4,816,904 A | 3/1989 | McKenna et al. |
| 4,890,322 A | 12/1989 | Russell, Jr. |
| 4,912,552 A | 3/1990 | Allison, III et al. |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | Von Kohorn |
| 5,251,324 A * | 10/1993 | McMullan, Jr. .............. 725/14 |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,389,964 A | 2/1995 | Oberle |
| 5,404,393 A | 4/1995 | Remillard |
| 5,410,344 A | 4/1995 | Graves |
| 5,446,490 A | 8/1995 | Blahut et al. |
| 5,446,919 A | 8/1995 | Wilkins |
| 5,534,911 A | 7/1996 | Levitan |
| 5,559,548 A | 9/1996 | Davis |
| 5,585,838 A | 12/1996 | Lawler et al. |
| 5,585,865 A | 12/1996 | Amano |
| 5,600,364 A | 2/1997 | Hendricks |
| 5,608,448 A | 3/1997 | Smoral et al. |
| 5,619,247 A * | 4/1997 | Russo ....................... 725/104 |
| 5,630,119 A | 5/1997 | Aristides |
| 5,661,516 A | 8/1997 | Carles |
| 5,724,521 A | 3/1998 | Dedrick |
| 5,724,525 A | 3/1998 | Beyers, II et al. |
| 5,752,159 A * | 5/1998 | Faust et al. ................ 725/105 |
| 5,754,383 A | 5/1998 | Huppertz et al. |
| 5,758,257 A | 5/1998 | Herz |
| 5,758,259 A | 5/1998 | Lawler |
| 5,774,170 A | 6/1998 | Hite et al. |
| 5,778,182 A | 7/1998 | Cathey et al. |
| 5,794,210 A | 8/1998 | Goldhaber et al. |
| 5,818,438 A | 10/1998 | Howe et al. |
| 5,838,314 A | 11/1998 | Neel |
| 5,848,396 A | 12/1998 | Gerace |
| 5,861,906 A | 1/1999 | Dunn |
| 5,892,508 A | 4/1999 | Howe |
| 5,892,536 A | 4/1999 | Logan |
| 5,917,481 A | 6/1999 | Rzeszewski |
| 5,948,061 A | 9/1999 | Merriman et al. |
| 5,973,683 A | 10/1999 | Cragun |
| 5,983,227 A | 11/1999 | Nazem |
| 6,002,393 A | 12/1999 | Hite |
| 6,005,597 A | 12/1999 | Barrett |
| 6,029,045 A | 2/2000 | Picco et al. |
| 6,076,094 A | 6/2000 | Cohen |
| 6,100,916 A | 8/2000 | August |
| 6,119,098 A | 9/2000 | Guyot et al. |
| 6,172,674 B1 | 1/2001 | Etheredge et al. |
| 6,185,614 B1 | 2/2001 | Cuomo |
| 6,202,210 B1 | 3/2001 | Ludtke |
| 6,252,586 B1 | 6/2001 | Freeman |
| 6,282,713 B1 | 8/2001 | Kitsukawa |
| 6,314,568 B1 | 11/2001 | Ochiai |
| 6,314,577 B1 | 11/2001 | Pocock |
| 6,327,574 B1 | 12/2001 | Kramer et al. |
| 6,345,256 B1 | 2/2002 | Milsted et al. |
| 6,434,747 B1 | 8/2002 | Khoo et al. |
| 6,446,261 B1 | 9/2002 | Rosser |
| 6,457,010 B1 | 9/2002 | Eldering et al. |
| 6,463,468 B1 | 10/2002 | Buch |
| 6,463,585 B1 | 10/2002 | Hendricks |
| 6,477,704 B1 | 11/2002 | Cremia |
| 6,487,538 B1 | 11/2002 | Gupta et al. |
| 6,496,818 B1 | 12/2002 | Ponte |
| 6,505,348 B1 | 1/2003 | Knowles |
| 6,507,839 B1 | 1/2003 | Ponte |
| 6,510,417 B1 | 1/2003 | Woods et al. |
| 6,631,360 B1 | 10/2003 | Cook |
| 6,714,992 B1 | 3/2004 | Kanojia et al. |
| 6,718,551 B1 | 4/2004 | Swix et al. |
| 6,762,168 B2 | 7/2004 | Chu |
| 6,845,396 B1 | 1/2005 | Kanojia et al. |
| 6,850,988 B1 | 2/2005 | Reed |
| 6,861,618 B2 | 3/2005 | Binet et al. |
| 2002/0123928 A1 | 9/2002 | Eldering et al. |
| 2002/0143647 A1 | 10/2002 | Headings |
| 2002/0143847 A1 | 10/2002 | Headings et al. |
| 2002/0199197 A1 | 12/2002 | Winter |
| 2003/0067554 A1 | 4/2003 | Klarfield |

FOREIGN PATENT DOCUMENTS

| | | |
|---|---|---|
| EP | 1162840 A2 | 12/2001 |
| WO | 97/17609 | 8/1994 |
| WO | WO 99 04561 A | 1/1999 |
| WO | WO 99 45702 A | 9/1999 |
| WO | WO 99 52285 A | 10/1999 |

OTHER PUBLICATIONS

Cauley, Leslie, "Microsoft Baby Bell Form Video Alliance," *The Wall Street Journal*, Sep. 28, 1994.

"allNetDevices:—Report: Interactive TV Soon to Become Direct Marketing Tool," allNetDevices, www.devices.internet.com/com_cgi/print/print.cgi?url=http://devices../report_interactive.html, (Nov. 16, 2001) pp. 1-2.

"Liberate Technologies—Solutions," Digital Cable Two-Way, www.solutions.liberate.com/architecture/dc2.html, (Nov. 16, 2001) p. 1 of 1.

"Liberate Technologies—Solutions," Digital Broadband Telco, www.solutions.liberate.com/architecture/db.html, (Nov. 16, 2001) p. 1 of 1.

"Liberate Technologies—Solutions," Liberate Connect Suite, www.solutions.liberate.com/products/connect_suite.html, (Nov. 16, 2001) pp. 1-2.

"Liberate Technologies—Solutions," Liberate imprint Server™ www.solutions.liberate.com/products/imprint_server.html, (Nov. 16, 2001) p. 1 of 1.

"Liberate Technologies—Solutions," Liberate Mediacast Server™ www.solutions.liberate.com/products/medicast_server.html, (Nov. 16, 2001) pp. 1-2.

"Spike High Performance server Array," Mixed Signals Technologies, Inc., www.mixedsignals.com. itvinfo@mixedsignals.com (2000) p. 1.

"power, flexibility, and control," RespondTV, www.respondtv.com/whyrespond.html (Nov. 16, 2001) pp. 1-2.

"It just clicks!," Respond TV, www.respondtv.com/inaction.html, (Nov. 16, 2001) pp. 1-2.

"The Wink System," Wink System Diagram, www.wink.com/contents/tech_diagram.html, (Nov. 16, 2001) p. 1 of 1.

"What is Wink?," www.wink.com/contents.whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

www.actv.com, Screen Print, Oct. 8, 2000.

"ACTV, Inc. Offers Exclusive Preview of 'Individualized Television' at Official All-Star Cafe," Business Wire, Sep. 16, 1998.

"ACTV's HyperTV & 'Individuallzed Television' to be Powered by Sun Microsystems JavaTV Technology," Business Wire, Apr. 21, 1999.

Whitaker, Jerry, "Interactive TV: Killer Ap or Technical Curiosity?", Broadcast Engineering, Dec. 1999.

Dickson, Glen, "Digital TV gets specifically directed," Broadcasting & Cable, Jun. 5, 2000.

Reed, David, "The future is digital," Precision Marketing, v. 13, n.51, p..27, Sep. 21, 2001.

U.S. Appl. No. 09/799,306, filed Jan. 8, 1997, Grauch.
U.S. Appl. No. 10/016,988, filed Dec. 14, 2001, Matz.
U.S. Appl. No. 10/017,111, filed Dec. 14, 2001, Matz.
U.S. Appl. No. 10/017,630, filed Dec. 14, 2001, Swix.
U.S. Appl. No. 10/017,640, filed Dec. 14, 2001, Matz.
U.S. Appl. No. 10/017,742, filed Dec. 14, 2001, Matz.
U.S. Appl. No. 10/036,677, filed Dec. 21, 2001, Swix.
U.S. Appl. No. 10/036,923, filed Dec. 21, 2001, Swix.
U.S. Appl. No. 10/037,005, filed Dec. 21, 2001, Matz.
U.S. Appl. No. 10/778,345, filed Feb. 17, 2004, Swix.

* cited by examiner

Clickstream Data 80

|  | Timestamp | Application ID | # Bytes to Follow | Application Specific Data Event ID | Channel ID |
|---|---|---|---|---|---|
| Event Record | 3:59:30pm | Cable App. | 4 bytes | Power On | ABC |
| Event Record | 4:00:00pm | Cable App. | 4 bytes | Channel Up | NBC |
| Event Record | 4:04:17pm | Cable App. | 4 bytes | Channel Up | TBS |
| Event Record | 4:06:25pm | Cable App. | 4 bytes | Channel Dwn | NBC |
| Event Record | 4:15:45pm | Cable App. | 4 bytes | Channel Up | TBS |
| Event Record | 4:55:45pm | Cable App. | 4 bytes | Power Off | None |

Prevue Guide Data 82

|  | Content ID | Channel ID | Start Time | End Time |
|---|---|---|---|---|
| Content Record | National News | ABC | 3:30:00pm | 4:00:00pm |
| Content Record | Murphy Brown | NBC | 3:59:00pm | 4:30:00pm |
| Content Record | Simpsons | NBC | 4:30:00pm | 4:59:00pm |
| Content Record | N.G.Explorer | TBS | 3:05:00pm | 4:05:00pm |
| Content Record | Andy Grifith | TBS | 4:05:00pm | 4:35:00pm |
| Content Record | NBA Basketball | TBS | 4:35:00pm | 6:05:00pm |

Broadcast Advertising Data 84

|  | Content ID | Channel ID | Start Time | End Time |
|---|---|---|---|---|
| Content Record | Coca Cola #10 | NBC | 4:00:30pm | 4:01:00pm |
| Content Record | Visa #2 | NBC | 4:01:00pm | 4:01:30pm |
| Content Record | Delta #1 | TBS | 4:03:30pm | 4:04:00pm |
| Content Record | Delta #3 | TBS | 4:04:00pm | 4:04:30pm |
| Content Record | Visa #21 | TBS | 4:04:30pm | 4:05:00pm |

Parse and Merge Data

Clickstream Timeline 92

|  | Timestamp | App. ID | # Bytes to Follow | Application Specific Data Event ID | Channel ID | Content ID |
|---|---|---|---|---|---|---|
| Event Record | 3:59:30pm | Cable App. | 6 bytes | Power On | ABC | National News |
| Event Record | 4:00:00pm | Cable App. | 6 bytes | Channel Up | NBC | Murphy Brown |
| Event Record | 4:00:30pm | Cable App. | 6 bytes | Change Content | NBC | Coca Cola #10 |
| Event Record | 4:01:00pm | Cable App. | 6 bytes | Change Content | NBC | Visa #2 |
| Event Record | 4:01:30pm | Cable App. | 6 bytes | Change Content | NBC | Murphy Brown |
| Event Record | 4:03:17pm | Cable App. | 6 bytes | Channel Up | TBS | N.G.Explorer |
| Event Record | 4:03:30pm | Cable App. | 6 bytes | Change Content | TBS | Delta #1 |
| Event Record | 4:04:00pm | Cable App. | 6 bytes | Change Content | TBS | Delta #3 |
| Event Record | 4:04:30pm | Cable App. | 6 bytes | Change Content | TBS | Visa #21 |
| Event Record | 4:03:17pm | Cable App. | 6 bytes | Change Content | TBS | N.G.Explorer |
| Event Record | 4:05:00pm | Cable App. | 6 bytes | Change Content | TBS | Andy Grifith |
| Event Record | 4:06:25pm | Cable App. | 6 bytes | Channel Dwn | NBC | Murphy Brown |
| Event Record | 4:15:45pm | Cable App. | 6 bytes | Channel Up | TBS | Andy Grifith |
| Event Record | 4:35:00pm | Cable App. | 6 bytes | Change Content | TBS | NBA Basketball |
| Event Record | 4:55:45pm | Cable App. | 6 bytes | Power Off | None |  |

Figure 7

METHOD AND SYSTEM FOR TRACKING NETWORK USE

This application is a continuation of U.S. application Ser. No. 08/779,306, filed with the U.S. Patent Office on Jan. 6, 1997, now abandoned.

This invention is a method and system for tracking subscriber use of network applications, particularly network applications involving delivery of interactive media or video programming.

BACKGROUND OF THE INVENTION

Broadcast and cable television have long dominated the visual media market. New communications technologies, however, have accelerated demand for new types of media such as video on demand, interactive video, interactive gaming, home shopping or interactive advertising. Unlike broadcast television, viewers of these services typically are paying "subscribers," although payments from advertisers also pay a large share of the costs of providing these media services.

To gauge the effectiveness of their spending, advertisers have long sought information on viewers' viewing patterns. A number of devices and techniques exist for gathering such information. For instance, U.S. Pat. No. 4,258,386 to Cheung and U.S. Pat. No. 4,556,030 to Nickerson, et al., describe the general concept of deploying in viewers' homes devices for monitoring a viewer's television set ("TV") in order to accumulate data illustrating viewing habits such as which channels were watched at particular times. Accumulated data is then forwarded via telephone lines to a central location for analysis. Cheung sends data from particular monitoring stations at a preselected, specific "window" of time; interruptions to transmission during that window result in the Cheung system forwarding the data at another time.

Other systems and methods provide somewhat more use data than just channel numbers viewed and time of viewing. Typically, however, the information is for a smaller subset of users. Thus, U.S. Pat. No. 4,816,904 to McKenna, et al., U.S. Pat. No. 4,912,552 to Allison, III, et al. and U.S. Pat. No. 5,374,951 to Welsh, all disclose monitoring "panelist" TV use in order to collect data about panelist viewing patterns as well as certain marketing information. Generally, panelist monitoring is used to gauge the effectiveness of advertising on selected groups of "panelists," each of which is one household in a group comprising a "panel," typically located in a particular geographical area.

Monitoring not only determines which commercial and TV programs the panelist views but also may be used to gather information about which products panelists purchase. For instance, the U.S. patent to McKenna discloses a remote data collection unit located at a panelist home that monitors viewer identification data and TV functions (e.g., channel viewed, VCR viewing time or game time). Additionally, a wand is provided for inputting bar codes of purchased items. Monitored data is sent via the telephone network to a central location, which can also download questionnaires to the panelist and receive responses. Allison and Welsh disclose similar monitoring systems and methods. Instead of simply monitoring the channel number that a panelist was viewing at a particular time, Welsh discloses monitoring identification information carried in the television signal vertical blanking interval that identifies preselected commercials. After detecting and storing the identification information that identifies particular commercials viewed by panelists, the data is transmitted by telephone to a central location for analysis.

Monitoring systems also have been used with some early interactive media systems. U.S. Pat. No. 5,404,393 to Remillard discloses an interactive TV system. Among other elements of the system, a controller monitors TV channels and time/date stamps the selected channel so that, indirectly, viewers' programming choices may be monitored. Data is assembled into a "user profile," which is uploaded to an appropriate facility via the telephone network.

Nevertheless, while panelist monitoring systems like those of Allison, McKenna and Welsh or interactive television monitoring systems like Remillard's provide somewhat more monitoring data than just TV tuning data, they do so only for limited groups. For example, when more data is gathered (like purchase information), it is done only for the panelist groups, rather than for subscribers to the entire system. Also, systems like McKenna's that uses a wand for scanning bar codes are intrusive systems that require user action to collect data rather than collecting data passively and automatically. Other systems contemplate capturing only some of the data generated by subscriber's viewing activities or only some of the ratings information. For instance, previous systems typically capture ratings information that identify television shows viewed rather than whether the subscriber viewed commercials displayed during those shows.

Perhaps more importantly, none of the systems described attempt to match "raw" information on channels viewed with programming information. Nor do those systems match viewing pattern information with demographics information about the particular users in order to provide more "targeted" advertising.

SUMMARY OF THE INVENTION

The present invention uses a collector, associated with a subscriber's set top box ("STB"), to obtain data about any "events"—subscriber actions or changes in programming—that are of interest. Data about virtually any events, from channels watched to volume changes to interactive applications invoked, may be captured with the collector. Event records comprising such data, as well as the identity of the application involved and the event time, are buffered. Periodically or on command, event records are uploaded from the buffer to a merge processor such as through an interactive network that allows for duplex communication with the STB. The merge processor, which may be a head end server or a workstation computer forming part of or coupled to the media delivery network, receives (1) the event data and (2) content data that identifies programming content broadcast or delivered throughout the region in which the system is deployed. Timelines showing particular events over time may then be generated for each subscriber. Rather than just determining the channel viewed and time of day, the event timelines describe the programming or interactive applications selected by or shown to a subscriber over a selected period of time (e.g., 24 hours).

The merge processor may further filter this collected and merged data to generate reports ranging from descriptions of a single user's viewing patterns to very high level viewing patterns showing the number of users who watched or participated in a particular program for a selected time period. Further, that information can be combined with billing and demographics information to provide detailed information on a particular subscriber's or group of subscribers' viewing and related buying patterns.

The present invention thus involves a method for obtaining detailed information on every application invoked by a subscriber and information about the type of programming shown. The first step is to identify data that describe the events of interest that occur. Those events include: the channel viewed, a switch to another channel, a passive change in programming because of a commercial break or change to a new program, use of a VCR or other ancillary device, or invocation of an interactive application and subscriber commands given to the system during the application. Event data also includes start and stop times, identification of the subscriber's STB or specific data needed to be recorded for any particular interactive or other application.

Event records are formed from this collected data and buffered before uploading through the interactive or other media delivery network to a headend, server or third party data analysis system. Before uploading, the captured data may be compressed and formed into packets for transmission.

Using the system or method of the present invention allows service providers to obtain ratings information and detailed information on subscriber viewing patterns and subscriber use of interactive applications. Thus, the present invention can track the number of subscribers viewing or watching particular programs, including advertisements. It also can track use of particular interactive applications such as video on demand. The invention automatically matches data describing programming content with event data describing a channel or application activated or controlled by the subscriber. This allows the invention comprehensively to track user "channel surfing." Also, the invention can compare subscriber demographics or billing information with viewing pattern information in order to tailor commercials to those subscribers; determine whether subscribers with a selected demographic background viewed a commercial of interest; or determine the demographics of subscribers that viewed selected commercials.

Persons skilled in the art will recognize that the present invention may be used with numerous types of networked media delivery systems. For instance, the method or system of the present invention can be deployed on an interactive media delivery system or modified for use with a conventional cable television network, a wireless cable television network, or a home satellite television network.

It is accordingly an object of the present invention to provide a system and method for collecting information about patterns of subscriber viewing and use of a media delivery system.

It is another object of the present invention to provide a system and method for determining which network applications, particularly interactive applications, are invoked by particular subscribers.

It is an additional object of the invention to provide a system and method for communicating collected information to a merge processor.

It is a further object of the invention to provide to the merge processor information about the programming content distributed over the media delivery system.

It is yet another object of the invention to provide a system and method for merging the collected information with the programming information in order to obtain comprehensive information about programming shown to or network applications invoked by subscribers. Other objects, features and advantages of the present invention will become apparent upon reading the rest of this document.

BRIEF DESCRIPTION OF THE DRAWINGS

FIG. 7 shows the results of a merge and parse process of the present invention.

DETAILED DESCRIPTION OF THE DRAWINGS

System Overview

Figure 1:
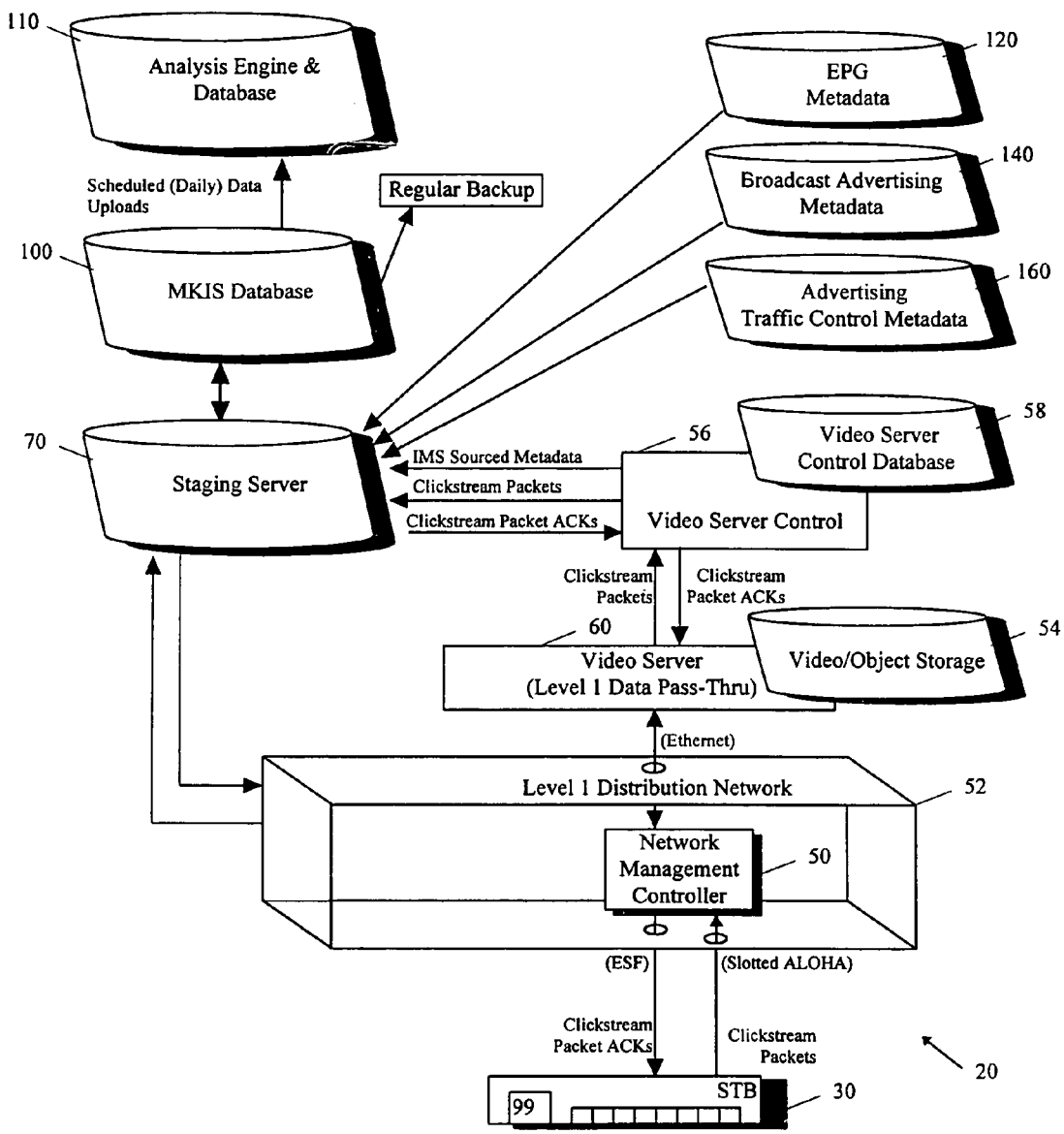
FIG. 1 shows a block diagram of elements of one embodiment of the system of the present invention.

FIG. 1 shows a block diagram of the components of the system 20. System 20 is a demographics and programming ratings collection and analysis system that may be deployed for use on an interactive media delivery system such as the Interactive Video Services Network deployed by BellSouth Interactive Media Services. That interactive system is described in co-pending application Ser. No. 08/428,718, assigned to the assignee of the present invention and which document is hereby incorporated in its entirety by this reference. However, persons skilled in the art will recognize that the present invention may be used with any of a variety of interactive media delivery systems, standard or wireless cable television systems, satellite television systems or other media delivery systems that allow duplex communication (perhaps with the return path via a separate (e.g., telephone) network) to a a set top box ("STB") 30 coupled to a subscriber's display device, such as a television set or the like.

In any event, FIG. 1 shows various system 20 elements and subsystems that communicate with each other to transmit collected information, data error detection schemes and data acknowledgments. Briefly, the STB 30 communicates through a distribution network 52 with a video server 60, such as a video transfer engine ("VTE"), that may be acquired from Hewlett Packard ("HP"), with a video/object storage database 54. Video server 60 couples to a video control server 56, such as an Inter Media Server available from Sybase and deployed on a platform such as an HP 9000, with a database 58. The video server control 56 controls video server 60 and also logs information about video server 60 use. A staging server 70 receives collected records of events of interest. These "event records" pass through the video server control 56, which also couples to a Marketing and Information System ("MKIS") 100 that couples to staging server 60, which receives (1) the event records and (2) content data from various sources 120, 140 and 160 identified in FIG. 1 and which describe programming content available through the interactive network to all subscribers. MKIS 100 may be coupled to a third party search and analysis system 110 that can provide customer support operations.

STB 30 provides a platform by which (1) content is converted to a selected video format (e.g., NTSC or PAL) and presented to the subscriber or (2), for interactive systems, messages are exchanged (including video data) over a network 52 with the staging server 70. STB 30 also could include platforms capable of: (1) receiving messages from a user input device, such as a hand-held remote control unit; (2) translating video signals from a network-native format into a format that can be used by the television or display device; (3) inserting alphanumeric or graphical information into the video stream in order to "overlay" that information on the video image; (4) providing graphic or audio feedback to a user; or (5) possibly the most basic function, simply routing a traditional broadcast signal to a viewing device connected to the STB 30. Analogous terms to STB include: Set-Top Terminal ("STT"), Cable Converter, and Home Communications Terminal ("HCT") and any of these devices may be coupled to or made a part of a display device for showing programming to subscribers. Generally, STB 30 may be a Richmond or 8600X available from Scientific Atlanta, a CFT 2200 available from General Instruments, Thomson's DSS or any other device equipped with (1) a microprocessor; (2) memory for operating instructions and storage; and (3) a control interface for accepting subscriber commands from a remote control device or control panel.

Figure 2:
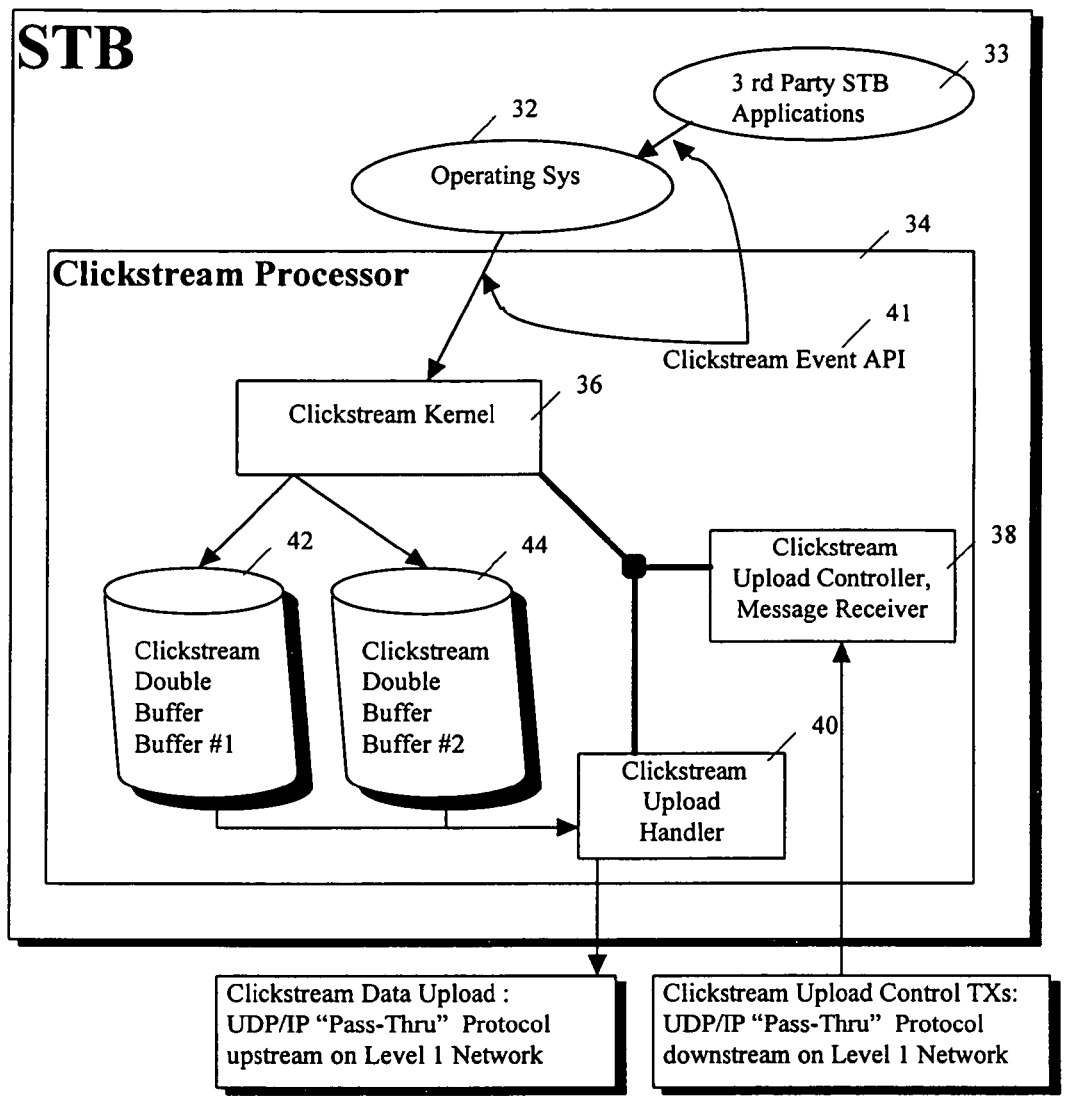
FIG. 2 shows a block diagram of a Set Top Box as used with the embodiment of the present invention shown in FIG. 1 and provided with a clickstream processor.

For the particular embodiment of system 20 shown in the Figures, collected event records that are packaged for transport through system 20 are called "clickstream" data or information. FIG. 2 shows a clickstream processor 34 that resides in the memory, such as DRAM or the like, of an STB 30 and which has a clickstream kernel 36, buffers 42 or 44, a clickstream upload handler 40, a clickstream controller 38 and a clickstream event API (application programming interface) 41.

Briefly, the clickstream kernel 36 buffers events passed to it by various network applications through the clickstream event API 41. Clickstream controller 38 accepts control messages from staging server 70 and appropriately stores their payload. Typical messages may be sent over the Extended Super Frame ("ESF") pass-through data link and control the uploading of clickstream data. Clickstream upload handler 40 accepts control messages over the system 20, which messages control the uploading of collected clickstream data over the reverse path through network 52. Also, the clickstream upload handler 40 stores the payload of these messages in appropriate and available memory and accepts the messages sent to it to acknowledge the receipt of uploaded clickstream data.

Referring again to FIG. 1, video server 60 provides information from video/object storage 54 to the particular interactive system over which system 20 is deployed. Clickstream data collected at STBs 30 can be uploaded to staging server 70 in any number of ways. For instance, FIG. 1 shows that the distribution network 52 could couple directly to staging server 70, allowing clickstream data packets sent from STBs 30 to be forwarded to staging server 70 directly and for staging server 70 to then return via the network 52 data acknowledgements. A network management controller 50 controls the flow of informationb through the network 52. Alternatively, FIG. 1 and, in greater detail, FIG. 4B, show that clickstream data packets may be sent to the distribution network 52 to the video server 60. Video server 60 passes through both clickstream data uploads from various STBs 30 and data acknowledgments returned to the STBs 30. A communications router inside the video server 60 redirects traffic to the appropriate destination. Video server control 56 similarly acts as a pass-through device for STB 30 clickstream data going to the staging server 70 and as a pass-through device for staging server 70 data acknowledgments to the STBs 30. Also, video server control 56 may provide log information that identifies interactive applications invoked by particular STBs 30. That log information is provided to the staging server 70 so that video server control 56 also acts as another data source about content available over the network, like EPG metadata source 120, broadcast advertising metadata source 140, or advertising traffic control metadata source 160. Staging server 70 collects all such clickstream data and content data, analyzes and then forwards it to MKIS database 100 or to a third-party analysis engine and database 110, as described in more detail in the text associated with FIGS. 5–7.

Journaling of Event Data

Clickstream processor 34 collects information to create a "journal" or log about all events or selected events of interest. An event is an action or a change in the state of a STB 30 that is deemed important to building a knowledge base on subscribers or their viewing patterns. For example, an event can include key presses to change channels or volume, mute, to enter the navigator for the interactive system, to turn the STB 30 off or on, to fast forward, to pause or to rewind a video obtained via the video on demand application. The events include applications called by the subscriber, such as interactive gaming applications, an electronic program guide, a video on demand or near video on demand application, a home-shopping application or a particular company's interactive application, such as The Weather Channel's weather on demand, World Span's travel on demand or Light Span's educational interactive application. Events include subscriber use of and control commands to peripheral devices coupled to the STB 30 or a subscriber's display device, such as a VCR or videodisk player.

Each application residing on the STB 30 interfaces with the clickstream processor 34 to send selected data for maintaining a desired journal. Assuming that the system 20 is used with an interactive system, many different applications may be deployed over that system and may be triggered by the subscriber. Some fairly typical applications that might be invoked include:

a cable television application that handles subscriber remote controls (like channel or volume changes);
  an electronic programming guide application such as TV Data, Prevue or Star Sight interactive services;
  an interactive game;
  a video on demand or near video on demand application;
  company specific applications, that might be offered by content provider such as the Weather Channel, MTV, Showtime, etc.; or
  a navigator application to help the user choose options.

Each of these applications, as well as some internal applications that the system 20 may wish to monitor, will be assigned a unique application identifier.

Clickstream processor 34 interfaces with the various applications resident in the STB 30's operating system 32 and any third party applications 33. Note that for systems using other types of STB 30's than the embodiment described in the Figures, those STB 30's need not have an operating system. Instead, all instructions can be written directly to the memories of those particular STBs. Applications 33 can be added by either downloading entirely new software directly to memory or by downloading new tables as described below.

When an application 33 reaches a point where an "event" of interest has been generated, the application 33 stores an event record to memory. The application 33 then launches to the clickstream kernel 36 the event record, including information such as: (1) the application's 33 identification code (e.g., the "Cable Television Application" or a particular interactive application); (2) a count of the amount of information (number of bytes) to be journaled; (3) a "time stamp" that defines a unique point in time, e.g., by defining the date and time of day, accurate to the hour, minute or second; (4) an identification code for the event, or (5) where the event data was stored. Clickstream kernel 36 uses the information provided by the applications 33 to collect the event data, format it and place it into a buffer 42 or 44. Table I shows the type of information that will be generally sent by the clickstream processor 34 to the buffers 42 or 44.

TABLE I

Application Event Record

| | Size |
|---|---|
| Timestamp | 6 bytes |
| Assigned Application ID | 16 bits |
| Number Bytes to Follow (length) | 8 bits |
| Application Specific Data with customized formats and lengths | Multiple Bytes |

Global table II defines events of interest that each application can identify, collect, store in the "Application Specific Data" field and notify the clickstream kernel 36. These events could be as simple as a broadcast channel change by pressing the "Chan Up" remote key. All of these event types can be accessed and used by each application. While each application may not use every possible event type, the number of events available for collection allows system 20 to extract any pertinent usage information for analysis. Also, the use of the global table II increases system 20 efficiency because event types can be modified, added or removed.

TABLE II

EVENT DEFINITIONS

| Code | Event |
|---|---|
| | Content Related Events |
| 0x0000 | Passive Content Change |
| | Direct Key Presses |
| 0x0001 | TV < > ITV Pressed |
| 0x0002 | Power Pressed |
| 0x0003 | One (1) Pressed |
| 0x0004 | Two (2) Pressed |
| 0x0005 | Three (3) Pressed |
| 0x0006 | Four (4) Pressed |
| 0x0007 | Five (5) Pressed |
| 0x0008 | Six (6) Pressed |
| 0x0009 | Seven (7) Pressed |
| 0x000A | Eight (8) Pressed |
| 0x000B | Nine (9) Pressed |
| 0x000C | Zero (0) Pressed |
| 0x000D | Channel Up Pressed |
| 0x000E | Channel Down Pressed |
| 0x000F | Volume Up Pressed |
| 0x0010 | Volume Down Pressed |
| 0x0011 | Last Channel Pressed |
| | Application/State Switching Related |
| 0x0028 | AC Power ON |
| 0x0029 | Application Switch (Normal) |
| 0x002A | Application Switch (Abnormal) |
| 0x002B | Application Terminated (Normal) |
| 0x002C | Application Terminated (Abnormal) |
| 0x002D | Soft Power OFF |
| 0x002E | Soft Power ON |
| 0x002F | OFF State Polling Event |
| | General |
| 0x0030 | Direct Channel Change |
| 0x0031 | Mute |
| 0x0032 | Un-Mute |
| 0x0033 | Volume Change Below 50% |
| 0x0034 | Volume Change Below 25% |
| 0x0035 | Volume Change Below 10% |
| 0x0036 | Volume Change Above 50% |
| 0x0037 | Volume Change Above 25% |
| 0x0038 | Volume Change Above 10% |
| 0x0039 | Change to Interactive Mode |
| 0x003A | Change to Broadcast Mode |

Note that Table II defines relative volume changes (e.g. "volume change below 50%," "volume change below 25%," etc.). Although the applications could capture the actual key presses that lead to these relative volume changes, that level of detailed information is of little use to system 20 operators. Also, capturing all that detail leads to more records and higher demands upon the transmission network 52 when those records are uploaded. Applications could also be configured to "filter" other unwanted details about other subscriber activities. For example, when subscribers "channel surf" by quickly flipping through a number of channels in a short period of time, the application could be configured not to record channel changes unless the subscriber paused for greater than a certain selected time period (e.g., 15 to 30 seconds). Again, this eliminates information of little use and decreases network traffic.

Table III defines a small portion of a sample global channel identification table that proposes codes for identifying national and local broadcasters. Such a table allows any application journaling events which occur while subscribers are viewing broadcast or cable television programs to identify the network carrying the programming content by using a subset of the global table II. In this way channel lineups can be changed yet the identifier for a broadcast or cable network would stay the same. The use of this mapping scheme eliminates the need to map an ever-changing channel number to a network.

TABLE III

Broadcast Channel Identification

| | |
|---|---|
| 0x0100 to 0x011F | News/Talk Shows |
| 0x0100 | CNN |
| 0x0101 | Headline News |
| 0x0102 | The Weather Channel |
| 0x0103 | CNBC |
| 0x0104 | CSPAN |
| 0x0105 | CSPAN-2 |
| 0x0106 | America's Talking |
| 0x0107 | Talk Channel |
| 0x0108 | Court TV |
| 0x0109 | The Crime Channel |
| 0x010A | National Empowerment TV |
| 0x0120 to 0x013F | Sports |
| 0x0120 | ESPN |
| 0x0121 | ESPN-2 |
| 0x0122 | SportSouth |
| 0x0123 | The Golf Channel |
| 0x0124 | Classic Sports Network |
| 0x0125 | Prime Network |
| 0x0126 | NewSport |
| 0x0140 to 0x015F | Music |
| 0x0140 | MTV |
| 0x0141 | VH-1 |
| 0x0142 | Country Music Television |
| 0x0143 | The Nashville Network |
| 0x0144 | The Box |
| 0x0145 | Video Jukebox |
| 0x0146 | MOR Music TV |
| 0x0147 | Music Choice |

Table IV below shows some possible identification codes for particular applications. Note that each application could be programmed to insert its application ID code into the event record without accessing table IV. But by having each application access the table IV during the journaling process, the system's 20 ability to modify or add application ID codes easily is enhanced because such codes could be populated across system 20 by downloading an updated table IV. Providing for downloading of new tables increases the application footprint and system 20 complexity so tables can also be part of the application programming.

TABLE IV

Application Identifiers

| ID Code | Content |
|---|---|
| 0x0000 | Operating System |
| 0x0001-F | Operating System Sub-Systems |
| 0x0010 | Application Manager |
| 0x0011 | Cable Television Application |
| 0x0012 | Clickstream Kernel |
| 0x0100 | EPG System |
| 0x0101 | Digital Pictures - Interactive Game |
| 0x0110-F | Viacom - MTV/Showtime, etc. |
| 0x1000 | Interplay Written Applications General ID |
| 0x1001 | Interplay Runtime Engine |
| 0x1002 | Interplay Navigator |
| 0x1003 | Interplay VOD |
| 0x1004 | Interplay NVOD |
| 0x1005 | Interplay TownGuide |
| 0x1100 | The Weather Channel, Weather On-Demand |
| 0x1101 | Worldspan - Travel On-Demand |
| 0x1102 | Lightspan - Educational Interactive Application |
| 0xFFFF | Missed Events Record |

Each particular application can simply reference the global application, event and channel identification tables (which periodically may be updated and then downloaded to STBs 30) in order to build an event record. Examples of application specific event records that may be created in this manner are shown in Tables V through VIII below and discussed in associated text.

A cable TV application 33 may tune analog or digital broadcast services. When a command to change channels is entered, the cable TV application 33 is invoked. The cable TV application 33 begins building an event record by inserting an application ID and time stamp into the record. Next, the application 33 determiines the "event ID" by cross-referencing the command with the global event ID table II for the proper code. Then, the application 33 journals the "Channel ID."

Although the Channel ID could simply be the number of the channel, that information means little. The fact that channel 6 was watched more than channel 7 has little or no meaning unless networks and, ultimately, the content delivered by those networks are associated with particular channels. Accordingly, the Channel ID may be a field, like a 16 bit field, which uniquely identifies the broadcast network displayed on that particular channel. The Channel ID may be determined by programming the cable TV application 33 to compare the channel number tuned with global broadcast channel identification table II, above, to determine the correct channel identification code. Correlating the channel number with the channel identification code found in Table III ensures accurate reporting even though channels may differ at different cable TV headends within a particular region or even though individual channel line-up changes may be made over a period of time. This correlation between channel number and channel identification code could be done also at the staging server 70 after it receives all of the event records, provided that correlation there accounted for different regional channel lineups.

TABLE V

Cable TV Application Event Record

| | Size |
|---|---|
| Application ID: See Application ID table IV | 16 bits |
| Timestamp: Identifies event time | 6 bytes |
| Event ID: See Global Event ID table II for Syntax | 16 bits |
| Channel ID: See Broadcast Channel ID table III for Syntax | 16 bits |

Table VI below shows a navigator application that may be provided in order to give subscribers an interactive menu that assists them in selecting from the many available programs and applications in an interactive network. The "Event ID" refers to the identification codes for commands relating to the Navigator application, which codes may be located by referring to the global event ID table II above. Table VI also shows some of the features of the navigator that might be used by the subscriber and that could be useful to track. The right hand column under "Size/Data" shows, first, next to the "Application state ID" that 8 bits are allocated to that record and, second, in the various rows beneath, the particular code that is journaled in order to indicate a subscriber accessed the identified (e.g. Fly-Thru, Main Menu, etc.) screen. Such information lets system 20 operators determine the screens that users are viewing heavily or lightly in order to replace less popular screens with more useful ones or to charge more for advertisements placed on heavy use screens.

TABLE VI

Navigator Application Event Record

| | Size/Data |
|---|---|
| Application ID: See Application ID table IV | 16 bits |
| Timestamp: Identifies event time | 6 bytes |
| Event ID: See Global Event ID table for Syntax | 16 bits |
| Application State ID: See below for information tracked: | 8 bits |
| Fly-Thru | 0x00 |
| Main Menu | 0x01 |
| Information (Help) Screen or Video | 0x02 |
| Movies Sub-Menu | 0x03 |
| Movie Categories Sub-Menu | 0x04 |
| List of Movies Sub-Menu | 0x05 |
| Movie Info Screen | 0x06 |
| Movie Buy State | 0x07 |

Table VII similarly shows the journaling information collected for a video on demand application 33 that may be launched in an interactive service from the Navigator application above or its equivalent. Some of the information collected here may include the amount of pausing, fast forwarding and rewinding. Additionally, the service provider may want to determine whether viewers are recording a video in order to charge them a recording fee. Similar information could be collected for a near video on demand service, which typically allow only incremental pause, forward or rewind.

TABLE VII

Video on Demand Application Event Record

| | Size/Data |
|---|---|
| Application ID: See Application ID table IV | 16 bits |
| Timestamp: Identifies event time | 6 bytes |

TABLE VII-continued

Video on Demand Application Event Record

| | Size/Data |
|---|---|
| Event ID: See Global Event ID table for Syntax | 16 bits |
| Application State ID: See below for information tracked: | 8 bits |
| Playing | 0x00 |
| Paused | 0x01 |
| Fast Forward | 0x02 |
| Rewind | 0x03 |
| Info (Help) Video or Screen Played | 0x04 |
| reserved | 0x05 |
| reserved | 0x06 |
| reserved | 0x07 |

Table VIII below shows the event record for the Electronic Program Guide (EPG) application 33. The EPG application 33 records the application ID, timestamp and event ID records just as do the above applications described in tables V–VII. Additionally, it has an application 33 state ID field that identifies which of the display screens were accessed by subscribers, as shown below.

TABLE VIII

Electronic Program Guide (EPG) Application Event Record

| | Size/Data |
|---|---|
| Application ID: See Application ID table IV | 16 bits |
| Timestamp: Identifies event time | 6 bytes |
| Event ID: See Global Event ID table for Syntax | 16 bits |
| Application State ID: See below for information tracked: | 8 bits |
| Initial Display Screen | 0x00 |
| Look Ahead Display 4 Hour | 0x01 |
| Look Ahead Display 8 Hour | 0x02 |
| Look Ahead Display 12 Hour | 0x03 |
| Look Ahead Display 16 Hour | 0x04 |
| Look Ahead Display 20 Hour | 0x05 |
| Look Ahead Display 24 Hour | 0x06 |
| Reserved | 0x07 |

Generally, similar information about other applications 33, such as home shopping, interactive gaming or any other new applications deployed over an interactive or other media delivery system, can be tracked in a similar fashion. Additionally, the journaling process may be used to track errors within the system 20, with clickstream kernel 36 journaling such errors using the same method as described above.

Over time, the journaling needs of system 20, or system 20 itself may evolve. Applications may be changed or new ones deployed. New events may become of interest to the operator of system 20. In order to provide flexibility for system 20, operators may download to STBs 30 new or replacement applications that will include the necessary processes for journaling all events of interest.

Sample Journal

Assume that Mr. Smith turns on his interactive television at 7:30 p.m. to watch a half hour news program on channel 5, which corresponds to CNN for that region. At 8:00 p.m. he accesses the Navigator application to order a video through the video on demand application. He then accesses the Video on Demand application, which automatically begins playing a video at 8:04, pauses the video at 8:50 and begins playing again at 8:55 until it is completed at 9:45, at which point he turns off his interactive TV.

Mr. Smith's activities generate the following event records shown in table IX below (for convenience, multiple events occurring under a single application are grouped even though separate records are created in operation):

TABLE IX

Sample Event Records

| | Data |
|---|---|
| Cable Application Event Record 1 Content | |
| Application ID: See table IV for application ID Code | 0x0011 |
| Timestamp: Identifies event time | 1/1/96 |
| | 7:30:01 p.m. |
| Event ID: See Global Event ID table II to retrieve code for "power pressed" | 0x002 |
| Cable Application Event Record 2 and 3 Content | |
| Application ID: See table IV for application ID Code | 0x0011 |
| Timestamp: Identifies event time (Date will be same for second entry) | 1/1/96 |
| | 7:30:03 p.m.; |
| | 8:00:01 p.m. |
| Event ID: See (1) global Broadcast Channel ID table III to determine that Channel 5 is CNN and locate code and (2) table II for an event ID code corresponding to an "iTV Press" by Mr. Smith. | 0x0100 |
| | 0x0001 |
| Navigator Application Event Record 4 Content | |
| Application ID: See table IV for application ID Code | 0x1002 |
| Timestamp: Identifies event time for accessing each screen. | 1/1/96 |
| | 8:01:30 p.m. |
| Event IDs: See table II for event ID code that identifies an "enter" command by Mr. Smith to invoke this application. | 0x0021 |
| Application State ID Code: This shows Mr. Smith accessed the Main Menu | 0x01 |
| Navigator Application Event Records 5–6 Content | |
| Application ID: See table IV for application ID Code | 0x1002 |
| Timestamp: Identifies event time for accessing each screen. A separate record is created for each activity, with a timestamp showing initiation of each activity. Each record will have the corresponding event and state. | 1/1/96 |
| | 8:02:00 p.m.; |
| | 8:03:00 p.m.; |
| Event IDs: See table II for event ID code that identifies an "enter" command by Mr. Smith to invoke this application. | 0x0021 |
| | 0x0021 |
| Application State ID Codes: This shows Mr. Smith accessed the Movies Sub-Menu and Movie Sub-menu list. | 0x03 |
| | 0x05 |
| Video on Demand Application Event Records 7–9 Content | |
| Application ID: See Application ID table IV (same for each record). | 0x1003 |
| Timestamp: Identifies event time for each event recorded by the application. (The day is the same for each record and each time corresponds with the activity identified below). | 1/1/96 |
| | 8:04:00 p.m. |
| | 8:50:00 p.m. |
| | 8:55:00 p.m. |
| Event ID: See table II for event ID codes that identify Mr. Smith's play, pause and play commands. | 0x0022 |
| | 0x0024 |
| | 0x0022 |
| Application State ID Codes: These show Mr. Smith activated this application, played, paused and then played again his selected video. | 0x00 |
| | 0x01 |
| | 0x00 |
| Cable Application Event Record 10 Content | |
| Application ID: See table IV for application ID Code | 0x0011 |
| Timestamp: Identifies event time | 1/1/96 |
| | 9:45:00 p.m. |
| Event ID: See Global Event ID table II to retrieve code for "power pressed" | 0x002 |

Event Record Upload Cycle

The variably sized event records are collected and then stored in one of two clickstream buffers 42 or 44. Capacity of each of the buffers may be statically provisioned or the system 20 may addressably download to particular STBs 30 an appropriate buffer 42 or 44 size. A buffer 42 or 44 may be an allocated, contiguous free area of STBs' 30 memory set aside for buffering event records only. Although advanced database techniques like link lists or record pointers could be used, they would increase the application footprint and complexity. Because buffer sizes of about 15 kB would probably accommodate the journaling needs of most applications, advanced database techniques need only be used for larger buffers. Buffers up to 15 kB should allow at least 4 to 8 hours of peak channel "surfing" between uploads (channel surfing typically will generate the most event records). In any event, empirical analysis of network use should determine the optimum buffer size.

Event records are directed to one of the two buffers 42 or 44, although a single or even more buffers could be used with the system 20. Conceivably, the system 20 could also be modified to upload event records in real time; however, that severely increases the possibility of instantaneous overloads in network traffic. Thus, system 20 preferably uses buffers 42 or 44 to buffer collected event records until they are upload.

Event records from a particular STB 30 may be uploaded in a format that assists in their transmission back through the distribution network 52 to the staging server 70. A header record may indicate the time the buffer 42 or 44 was first opened, the number of bytes in the buffer 42 or 44, the originating STB 30 by address, the version of the clickstream kernel 36 which generated the record and the type of data compression used on the following data (if any). This first header record may be of fixed length and uncompressed. Information following "Compression Type" may be compressed to save in transmission bandwidth. Table X below shows this general header format:

TABLE X

Buffer Header Record

| | Size |
|---|---|
| Transaction Code | 8 bits |
| Clickstream Version Number | 8 bits |
| Timestamp | 6 bytes |
| Number of Bytes | 8 bits |
| STB Unique Address Most Significant | 16 bits |
| STB Unique Address Least Significant | 32 bits |
| Compression Type | 8 bits |

When (1) a buffer 42 or 44 fills, (2) an upload timer event expires or (3) upon command from the staging server 70, the clickstream processor 34 initiates an upload process. During that process the uploading buffer 42 is locked and subsequent event records are routed to and stored in the second buffer 44. When upload of buffer 42 is completed, records continue to buffer 44 until the next upload time, after which buffer 44 locks and records go to buffer 42. This cycle continues to repeat.

Figure 3:
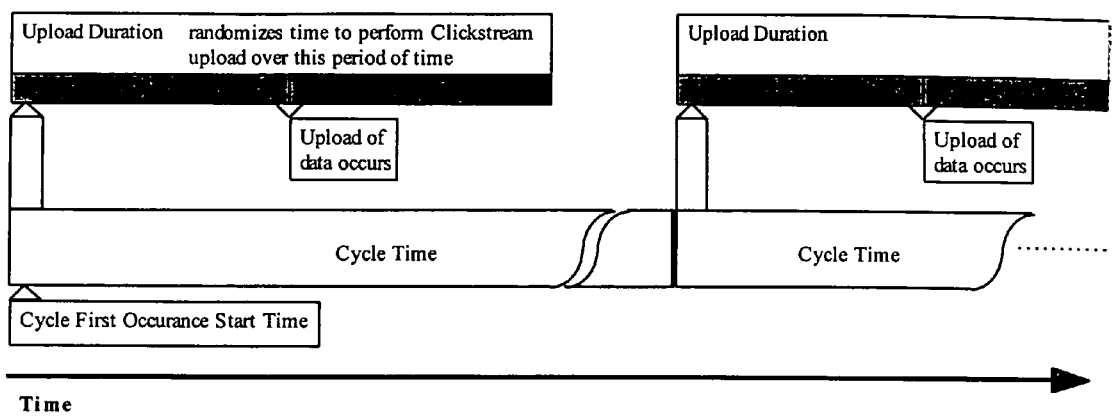
FIG. 3 shows a schematic diagram showing the upload cycle for collected event data.

FIG. 3 shows an upload cycle diagram illustrating one method of evenly distributing increased traffic on the network 52 caused by upload of event records. The clickstream upload cycle consists of several parameters that define a start time and a cycle over which the uploading of data occurs. The "first occurrence" parameter defines a starting time in history from which the cycle runs. The "cycle time" parameter defines the amount of time which elapses between periods of the upload cycle. When a cycle is complete the "upload duration" time starts, and the clickstream processor 34 of each STB 30 will randomize an exact upload time within the upload duration. This timing of upgrades will distribute the network load evenly over the entire upload duration period.

An example of the use of these parameters would be to define a period of time every day for STBs 30 within system 20 to upload data. Typically, the system 20 operator may want the data available every morning for analysis. Peak use of broadcast prime time or of interactive services will typically be from 7 p.m. until 12 p.m., during which time no uploads should occur in order to minimize the burden on the network 52. Beginning at 12 p.m., uploads of event records out of a buffer 42 or 44 would begin. In order to have all STBs 30 upload before 8 a.m., the STBs 30 may be divided into upload groups, e.g., 32, with each group uploading over a selected (e.g., 15 minute) period. To achieve this upload cycle, the following parameters are defined in the FIG. 3 cycle in table XI:

TABLE XI

Upload Cycle Parameters

| Parameter | Definition |
|---|---|
| Cycle_First_Occurance_Start_Time | 12:00 am Jan 1, 1995 + "X" * 15 minutes. "X" staggers each upload group by 15 minutes; X = number of Groups |
| Cycle Time | 24 hours |
| Upload Duration | 15 minutes |

A total of four upload cycles will be defined for each group of STBs 30, which allows for weekly uploads or any other combination of cycles to work around peak network 52 load times.

STBs 30 can be instructed as to their role in uploading by sending from staging server 70 appropriate commands that are handled by the clickstream upload controller 38. For instance, the following commands may be addressed and sent by staging server 70 to a single or group of STBs 30.

TABLE XII

Clickstream Upload Control Commands

| Octet# | Contents | | |
|---|---|---|---|
| T 0 | Transaction Code MSB = 0 × 80 | | |
| T 1 | Transaction Code LSB = 0 × 10 | | |
| 0 | Clickstream Processor Version Number | | |
| 1 | Global Addressable Group Address | Denotes the group of STBs to field this 1 transaction (b5) | |
| | Flag (b1) | Flag (b1) | |
| 2 | Collection On/Off Key | Will turn clickstream collection On/Off to a STB or Group of STBs (non-Global only). | |
| 3 | Perform Upload Now Key | Will perform an upload on command. Will only upload on command if Global Flag is NOT set. | |
| 4 | Suppress Upload on Buffer Ful | Will keep the STB or Group from uploading when buffer is full. The STB or Group will only upload on it's appointed upload cycle. | |
| 5 | Upload_Cycle_Definition | A STB will have 1 to 4 possible upload cycles defined. This will define any one of those cycles. | |

TABLE XII-continued

Clickstream Upload Control Commands

| Octet# | Contents | |
|---|---|---|
| 6 | Cycle First Occurrence Start Time (Total b48) | Year (b8) Defines the time for first upload in cycle. |
| 7 | Cycle First Occurrence Start Time | Month (b8) |
| 8 | Cycle First Occurrence Start Time | Day (b8) |
| 9 | Cycle First Occurrence Start Time | Hour (b8) |
| A | Cycle First Occurrence Start Time | Minute (b8) |
| B | Cycle First Occurrence Start Time | Second (b8) |
| C | Upload Duration (Total b24) | Hours(0–24) (b8) Defines a duration of time over which the STB randomizes upload start time. |
| D | Upload Duration | Minutes(0–59) (b8) |
| E | Upload Duration | Seconds(0–59) (b8) |
| F | Cycle Time (Total b32) | Days (0–14) (b8) Defines the periodicity (mean time) between uploads. |
| 10 | Cycle Time | Hours(0–24) (b8) |
| 11 | Cycle Time | Minutes(0–59) (b8) |
| 12 | Cycle Time | Seconds(0–59) (b8) |

Depending on how the system is configured, the commands instruct STBs 30 to: 1) define the cyclic upload for various groups of or even all STBs 30; 2) require STBs 30 to upload on command/polling control (addressable only); 3) suppress upload when a buffer 42 or 44 fills; or 4) turn on/off event record collection by particular or groups of STBs 30.

Event Record Formatting, Upload and Capture

After the upload process triggers, each STB 30 typically initiates upload by first locking the buffer 42 or 44 to be uploaded and then compressing the contents of that buffer 42 or 44. A number of different compression techniques may be used, however, about 50% compression may be achieved with LZW compression utilities. Such compression substantially reduces the load on network 52 caused by numerous STBs 30 uploading event records. Compressed data is divided into transmission "transactions" or "packets" and packet headers are addressed to indicate packet identification, IP destination address, etc. The actual network connection can be initiated by the operating system for the particular STB 30. Persons skilled in the art will recognize that the type of and manner of invoking and implementing the network connection will vary depending upon the type of media delivery network over which system 20 is deployed.

For instance, the STB 30 can be configured to insert UDP/IP headers and trailers taken from the RFC 791 or RFC 768 specifications published by the ISO. Each data packet may have UDP/IP protocol built around a Level 1 pass-through header, such as shown in Table XIII below:

TABLE XIII

UDP/IP Protocol for Headers

IP Header

| IP Version | Header Length | Type of Service | Total Length |
|---|---|---|---|

TABLE XIII-continued

UDP/IP Protocol for Headers

| Identification | Flags | Fragment Offset |
| Time to Live | Protocol | Header Checksum |
| | Source IP Address | |
| | Destination IP Address | |
| | UDP Header | |
| Source Port | | Destination Port |
| Length | | Checksum |

In the embodiment shown in the Figures, the clickstream processor 34 will identify a particular VSP—Video Service Provider, which is an entity connecting to network 52 to distribute services—like VSP 66 shown in FIG. 4B, as the destination of these data packets. All of the data to be uploaded appears as "payload" to the STB 30, the signaling network 52, the network management controller 50, and the event capture process 71 on the staging server 70. After an appropriate header and trailer inserted at the STB 30, the upload data packet may have the format shown in Table XIV:

TABLE XIV

Clickstream Upload Data Packet

| Octet# | Contents |
|---|---|
| T 0 | Transaction Code MSB = 0x80 |
| T 1 | Transaction Code LSB = 0x18 |
| 0 | Clickstream Processor Version Number |
| 1 | Upload Sequence Number |
| 0x02 thr. 0xFA | Clickstream Upload Buffer Data Structure (as shown in Table I and X). The data may be broken up into as many reverse path transactions as necessary to complete data upload. |

Providing two buffers 42, 44 allows event record collection to continue during upload. Assuming buffer 42 is being uploaded, if the second buffer 44 fills during the upload process, a buffer overrun condition occurs. To account for such an occurrence, the buffer trailer record sent during upload from STBs 30 may denote such an error condition. The structure of the buffer trailer record may take the form as shown in Table XV below and include a time stamp, assigned application identification, length and upload code.

TABLE XV

Buffer Trailer Record

| | Size |
|---|---|
| Timestamp | 6 bytes |
| Assigned Application ID | 16 bits |
| Number Bytes to Follow (length) | 8 bits |
| Upload Status Code | 8 bits |

These upload status codes identify the stage of the upload process at the time a buffer 42 or 44 overflow occurred. Thus, some possible upload codes could include: upload not used, upload in progress, upload completed but no acknowledgment received, upload completed but only partial acknowledgment received or no upload attempted. This will let the staging server 70 know that STB 30 event records are missing beginning at that time. Also, receiving a buffer overrun record informs the staging server 70 that buffer 42 or 44 sizes have not been set appropriately. Buffer 42 or 44 sizes can then be reset and released to the system 20 as an update or released to a particular STB 30 by sending it an appropriate command.

Note that the packetization description above is for one embodiment of the system 20. However, generally, to upload collected event records, STBs 30 can initiate whatever "upstream" data transmission process used by the interactive, cable television or other media delivery system with which the system 20 is used. That process will upload the event records in the appropriate system format.

In any event, for system 20, clickstream data packets are uploaded to the staging server 70 over a slotted-ALOHA (a contention-based standard transport protocol) data transmitter of the STB 30. Data acknowledgments from the staging server 70 are sent; each is addressed to particular STBs 30. The frequency and period of data acknowledgments may be determined by considering network error rates, network packet error rates and causes of those types transmission errors.

Figure 4A:
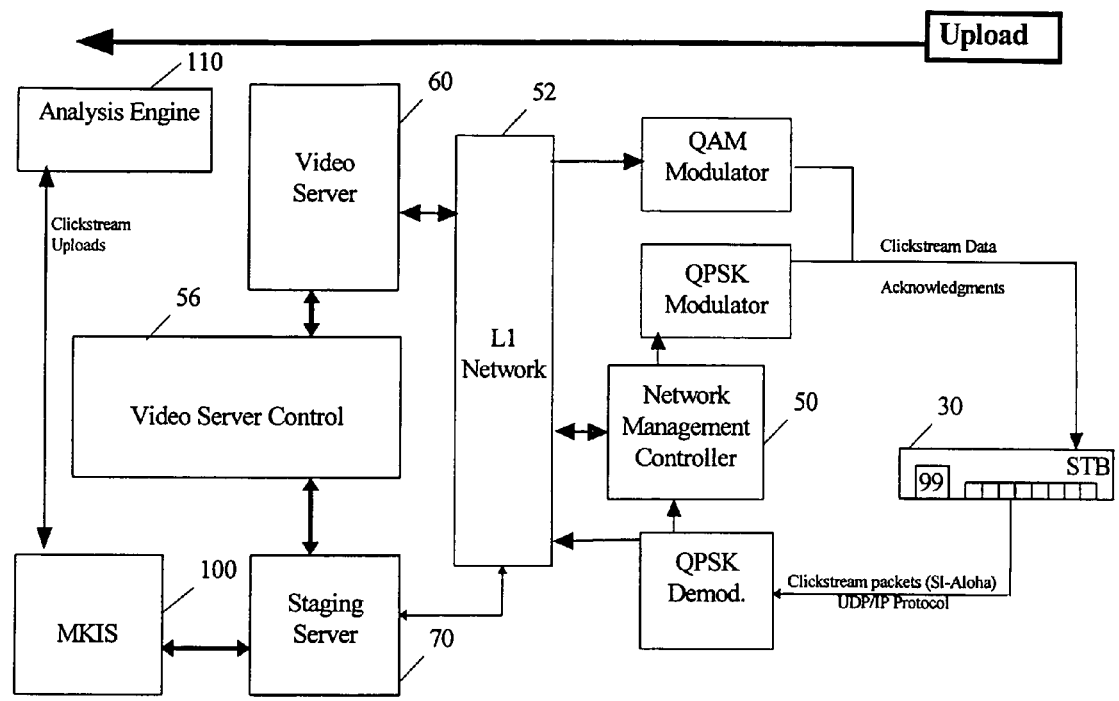
FIGS. 4A and 4B show the upload of collected event data from a selected Set Top Box through the network to the staging server shown in FIGS. 1 and 5.
Figure 4B:
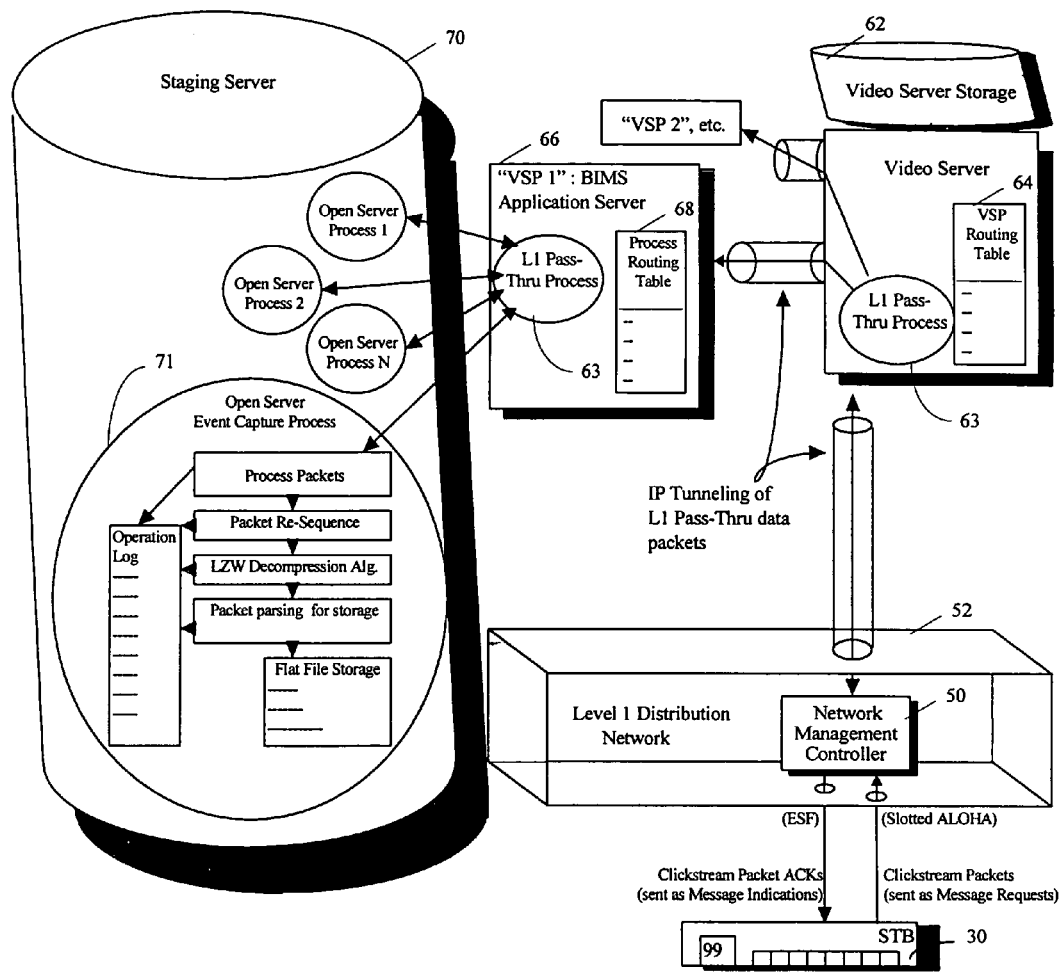

FIGS. 4A and 4B show in greater detail the clickstream data flow through the system 20. Briefly, FIG. 4A shows that clickstream packets of event records are transmitted from each STB 30 to the network management controller 50, which acts as a video service provider router. From the network management controller 50, which manages traffic over network 52, packets are forwarded via the network 52, video server 60 and video server control 56 to the staging server 70, which couples to MKIS 100 and analysis engine 110. Thus, event records collected and buffered at STBs 30 are transmitted to the staging server 70 for collection and analysis.

FIG. 4B shows this process in more detail and also describes an event records capture process 71 at staging server 70.

As noted, once a buffer 42 or 44 fills or the clickstream processor 34 decides to upload data for other reasons (time expiration, low system utilization, commanded upload, etc.), the buffer 42 or 44 will be formatted, compressed and then uploaded through the system 20 to the staging server 70. The upstream data packets may travel from the network management controller 50 across the distribution network 52 to video server 60 through a process called IP ("Internet Protocol") tunneling, which is essentially automatic IP routing based upon information in the packet payload. The same process can be used to route packets through network 52 directly to staging server 70 without going through video server 60. FIG. 4B shows that, at video server 60, an L1 pass-through process 63 uses a VSP routing table 67 to associate destination IP addresses with corresponding tags inserted in the received data packets. This process re-directs the data packets to the application server 66 L1 pass-through process 63 by associating the tags with the appropriate listed destination—here, the application server 66. The L1 pass-through process 63 on application server 66 performs a similar function with the data packets, routing them based on a payload identifier (transaction code or other) to an event record capture ("ECAP") open server process 71 on the staging server 70.

When the ECAP process 71 receives a clickstream data packet, it accepts the data packet and correlates the source address of the data packet with an upload session already in progress with a particular STB 30. If there is currently no upload in progress with that STB 30, then one is considered to be initiated. ECAP process 71 processes the upload of data in accordance with the particular protocol needed for the system 20. After receipt of all clickstream data packets associated with the upload from a particular STB 30, the ECAP process 71 sequences the packets into proper order (particular packets may have arrived out of their original transmission sequence because of transmission delays in network 52), decompresses the packets, eliminates transport overhead (e.g., trailers, headers, etc.) and stores them, such as in a flat file, for later analysis. At the end of a selected period, like 24 hours, the file is closed and a new one is opened, which allows a subsequent merge and parse process to batch process discrete files that cover discrete time periods. Immediately after initiation of and during the ECAP process 71, an operation log is opened to record information about the initiation and termination of each upload session and any errors.

Figure 5:
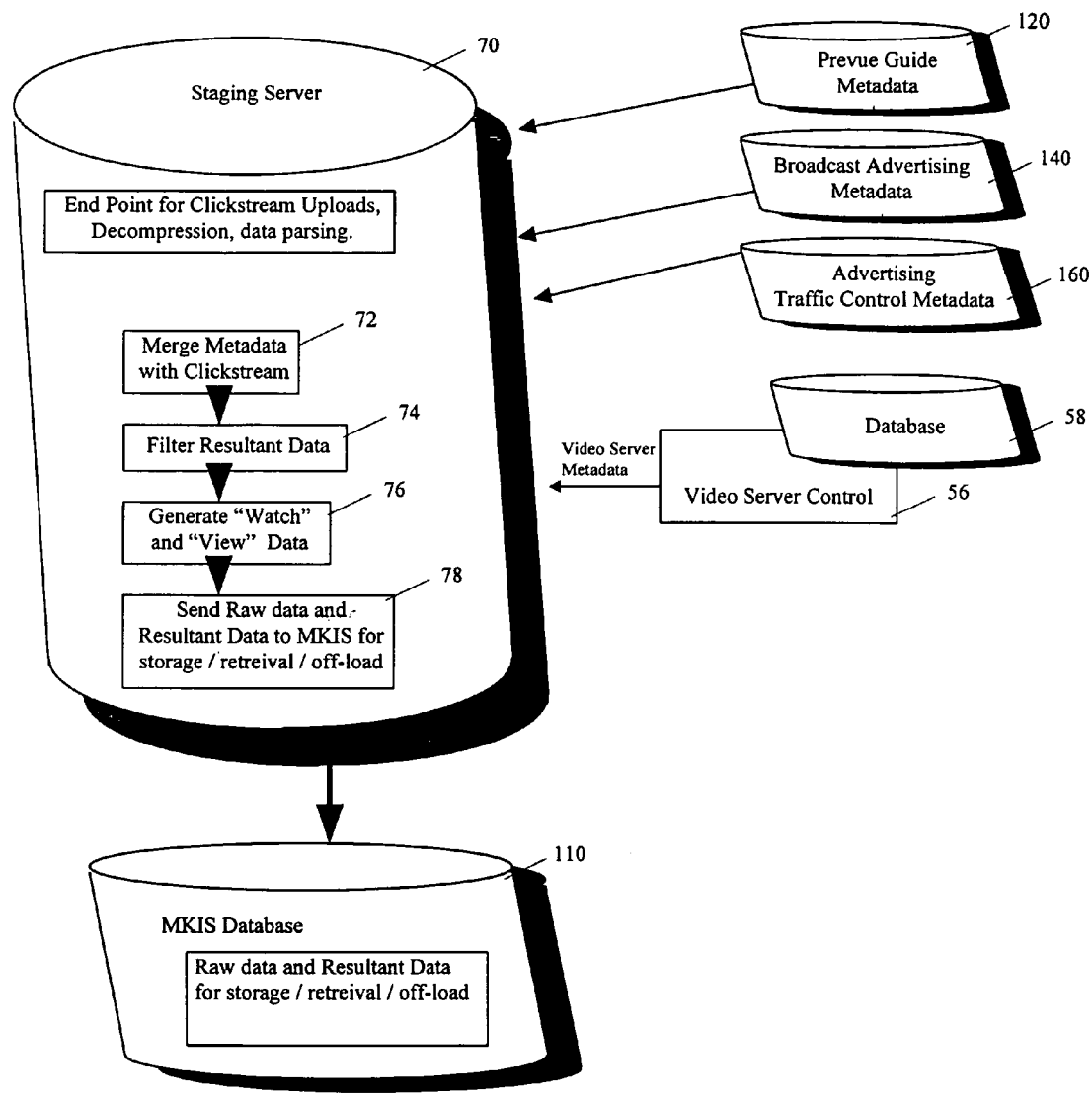
FIG. 5 shows an overview of the staging server, its functions and its interconnections with various data sources.

As shown in FIG. 5, staging server 70 will formulate and send a data acknowledgment to each STB 30 engaged in the upload process. One method of doing so is to send acknowledgments as addressable downstream level one pass-through transactions over network 52 to the STB 30. Such data acknowledgments provide redundant error correction because failure to receive them may alert STB 30 to a possible transmission error.

Merging and Parsing

Figure 6A:
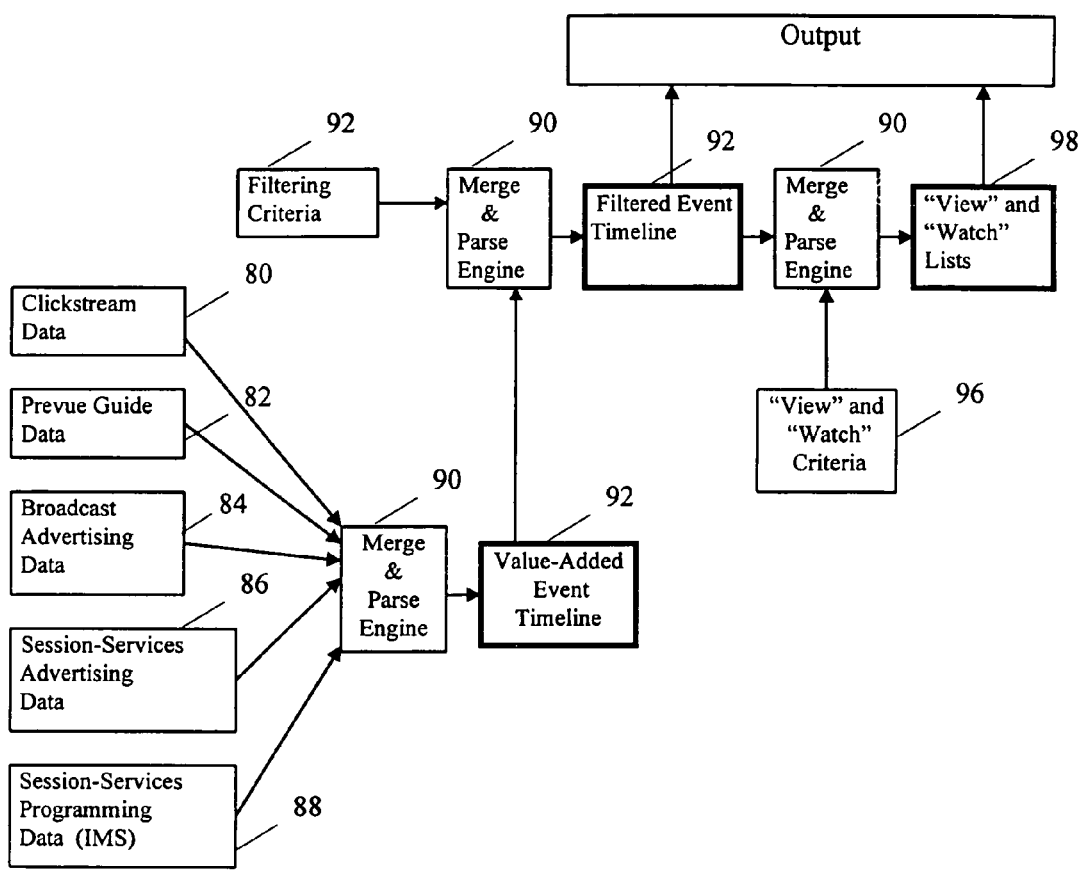
FIG. 6A shows the system elements required for merging and parsing the event and content data collected by the present invention.
Figure 6B:
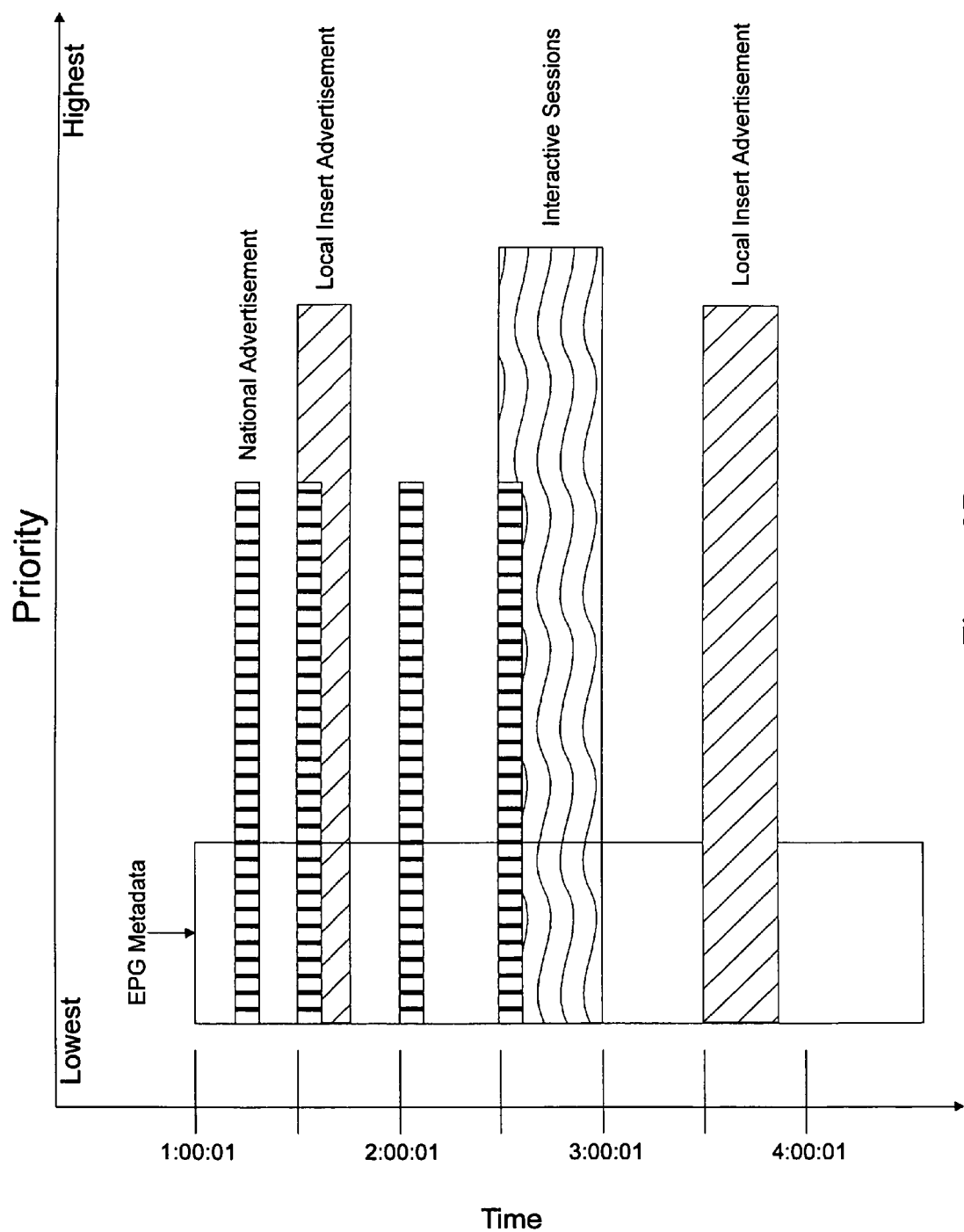
FIG. 6B shows the assignment of priority to content data necessary for completing the merge and parse process.

FIGS. 6A and 6B show an overview of the merging and parsing process and FIG. 7 shows sample results following that process. Briefly, the aim of the merge and parse process is to merge each STB 30's event records with various "metadata." "Metadata" refers to (1) programming of virtually any type shown on system 20 including the time and broadcast or cable network providing such programming or (2) interactive applications invoked by subscribers. For instance, metadata includes the following sources of data: EPG broadcast programming schedule data 82, broadcast advertising schedule data 84, local advertising schedule data or session-services advertising schedule data 86 and session-services programming schedule data 88. (Session-services advertising refers to advertising inserted by video server 60 during particular interactive sessions with the subscriber that are the session-services programming).

Collectively, all of this data enters into a merge and parse engine 90 that creates an event timeline 92 for each STB 30. Merge and parse engine 90 may be deployed upon staging server 70 or the MKIS system 100. So deploying merge and parse engine 90 on staging server 70 allows collected event records to be merged and parsed. The resulting event timelines 92 can be sent to MKIS system 100 for further analysis.

Timeline 92 provides a snapshot of activity on a particular STB 30 for a selected period (e.g., 24 hours) or for a selected event—for instance, a timeline 92 would be created for each STB 30 tuning to a particular show or shows (e.g., a pay per view fight) that may occur over a selected period. Timeline 92 is created by merging event records with metadata about programming available over the network for the selected time period.

To merge that data, proper priority must be assigned to data that otherwise may be conflicting. For instance, broadcast advertising data 84 may indicate that a certain national ad was run at Time A. On the other hand, if the system 20 is an interactive system and the interactive server provided a targeted advertisement ("ad") also at Time A, as indicated by session-services advertising data 86, that targeted ad was inserted over the national ad at Time A. Thus, by assigning session-services advertising data 86 a priority higher than national broadcast advertising data 84, the merge and parse engine 90 is able to create an accurate timeline 92 of programming delivered to a particular STB 30. Similarly, even a traditional cable or wireless cable network requires priority assignments. Typically, local cable operators typically are allowed to insert local ads over certain national ads (assuming they can sell that local ad time).

FIG. 6B depicts such priority assignments. FIG. 6B shows several sources of data, such as EPG metadata, National and Local Insert ad metadata and Interactive Sessions metadata. EPG metadata is usually very broad—for instance, showing a football game on channel 1 from 1:00 to 4:00 p.m. Thus, EPG metadata is assigned a priority lower than that of national ad metadata because a particular national ad will be overlayed into a particular time slot broadly defined by the EPG. In turn, local insert ad metadata trumps national ad metadata because the national ad metadata may not account for situations where a local network or affiliate inserts a local ad over the national ad scheduled for a particular timeslot. Finally, interactive sessions metadata, which reflects subscriber selections, has the highest priority as it shows the subscriber stopped watching a particular channel and instead invoked an interactive session.

Applying these priority rules produces a timeline 94 for each subscriber. Additional filtering criteria 94 are applied by the merge and parse engine 90 in order to generate a further refined timeline 94, as depicted in FIG. 6A. For example, event records may include such highly granular and specific information as the number of volume ups or channel ups that a particular subscriber entered. One set of filtering criteria 94 may ensure that the timeline 92 includes only channels that were viewed for more than a threshold (e.g., 15 seconds) time period. This eliminates any very fast channel changes made by the subscribers, thereby simplifying the event timeline 92 because event records that do not meet the criteria 94 are filtered out of the event timeline 92.

Merge and parse engine 90 also may apply other criteria to the filtered timeline 94 (or the original timeline 92), as shown in FIG. 6. Specifically, advertisers may wish to apply "view" and "watch" criteria 96. This criteria 96 will identify those programs and advertisements that are "viewed" by subscribers for less than a certain threshold amount of time. Programming seen by subscribers for more than that threshold, would be identified as "watched" programming. For example, for a 30 second ad, the threshold might be 15 seconds. If a subscriber was tuned to a channel displaying that ad for less than 15 seconds he would be deemed to have simply "viewed" that ad; on the other hand, if the subscriber was tuned to the channel carrying that ad for 25 seconds of the ad's length, he would be deemed to have "watched" it. This criteria 96 allows system 20 operators to charge more for "watched" ads versus those that are merely "viewed." Similar criteria can be applied against programming in order to more accurately gauge ratings. Thus, for a 30 minute program, if a user was tuned to that program for less than 10 minutes, the view and watch criteria 96 may decide that the program was only "viewed." In any event, applying the view and watch criteria 96, merge and parse engine 90 creates "view" and "watch" lists 98 that are useful for the system 20 operator and advertisers who contract with system 20 operator.

Note also that other criteria than simply how much time a tuned to a particular channel may be included in the view and watch criteria 96. For instance another criteria may be volume level. If a viewer was tuned to a channel for the full thirty second length of an ad but hit the mute button or changed the volume below a certain threshold for that ad, view and watch criteria 96 may classify that ad as a "viewed" ad.

Generally, merging and parsing should be done on discrete segments of data, such as 24 hour segments, as soon as possible in order to minimize the occurrence of un-resolved events. In other words, discrete events are simply pieces of the entire picture. To analyze only several hours of clickstream event data would not allow determination of such things as programming "watched" versus "viewed."

FIG. 7 shows a sample merge of event records or clickstream data 80, EPG data 82 from Prevue or a similar service and broadcast advertising data 84 that creates a clickstream timeline 92, which shows both the channels selected by a subscriber and the content displayed on those channels while the subscriber watched them.

A timeline 94 for each STB 30 is built and uploaded by staging server 70 to the MKIS database 100 or a third party analysis engine and database 110, either of which may store demographics and be used to run queries against the event timelines 94 and those demographics. Combining the timelines 94 with demographics information allows for even more detailed and granular information about subscribers and their viewing habits. For instance, consider the following examples:

EXAMPLE 1

Widget Co. has ten different advertisements that it has been running on system 20. Widget Co. wishes to know whether subscribers are "viewing" or "watching" particular ads. Because of the detailed information captured by the system 20 of the present invention, a query can be formulated to determine (a) which subscribers "watched" particular 30 second advertisements for greater than 15 seconds versus (b) which subscribers simply "viewed" the ad, for less than 15 seconds.

EXAMPLE 2

When event timelines 94 (or view and watch lists 98) are loaded into MKIS 100 or analysis engine 110, the same query can be run for a particular demographic group. For instance, Widget Co. wishes to know which particular ads its primary customer base, baby boomers between ages 40 and 50 and with income over $50,000 per year, "watched" versus "viewed" their advertisements.

Obviously, the system 20 can also be modified to target ads to particular demographic households based on feedback from parsed and merged data. Then, event records occurring after those targeted ads are broadcast over system 20 can be checked to determine whether the particular demographic market targeted watched or viewed the advertisement.

The foregoing is provided to explain and disclose preferred embodiments of the present invention, modifications to which may be made that still fall within the following claims. For instance, the architecture and programming of the system may be modified. Or, a variety of different manufacturers' servers, set top boxes or databases may be configured in order to implement the system. The particular identification codes and allocated sizes show in the tables and described herein may also be greatly modified. Further modifications and adaptations to the described embodiments will be apparent to those skilled in the art and may be made without departing from the scope or spirit of the invention and the following claims.

What is claimed is:

1. A system for collecting and processing information about subscribers' selection and use of programming distributed over a media delivery network, the system comprising:
   a) merge processor coupled via means for communication to
   b) a plurality of set top boxes, each comprising a processor for
      (1) collecting a plurality of event records that describe selected commands from a subscriber to a particular set top box and
      (2) transmitting event records to the merge processor;
   c) wherein the merge processor forms an event timeline describing a subscriber's selection of distributed programming for a discrete time period by merging the event records with programming data describing programming available via the media delivery system.

2. A system according to claim 1 wherein the programming data comprises data collected from at least two sources selected from the group consisting of: a broadcasting schedule source, a national advertising schedule source, a local advertising schedule source and an interactive application use schedule source.

3. A system according to claim 1 wherein each set top box further comprises a plurality of applications capable of being invoked by a subscriber.

4. A system according to claim 3 wherein each event record comprises:
   (1) an application identifier corresponding to the application associated with the recorded event;
   (2) an event identification code; and
   (3) a time stamp associated with the initiation of the event.

5. A system according to claim 4 wherein each application creates an event upon detection of selected commands from the subscriber.

6. A system according to claim 1 further comprising a buffer for storing the event records before transmission.

7. A system according to claim 1 wherein the merge processor forms an event timeline for each of the plurality of set top boxes.

8. A system according to claim 7 further comprising an analysis engine for correlating the event timelines with demographics information describing the subscribers.

9. A method for journaling information about subscriber use of a media delivery network for delivering programming and a merge processor for analyzing the resulting journaled information, the method comprising the steps of:
   a) collecting information about a plurality of subscribers' use of a media delivery network, the collecting step comprising:
      i) identifying commands of interest from each subscriber;
      ii) forming event records that record at least the commands of interest and a time associated with the command;
   b) transmitting event records to the merge processor;
   c) merging the event records with data describing the programming delivered over the media network in order to form event timelines of which describes the programming selected by a particular subscriber over a discrete time period.

10. A method according to claim 9 wherein the identifying step comprises the step of correlating each command of interest with a global table comprising identification codes.

11. A method according to claim 9 further comprising the step of filtering the event timelines in order to classify subscribers' viewing patterns into at least two categories.

12. A method according to claim 11 wherein the first category comprises programming watched by a subscriber for greater than a selected threshold percent of the total program length.

13. A system for determining the viewing habits of subscribers to a media delivery network for delivering programming, the system comprising:
 a) a collector for collecting event records describing subscribers' selection and use of programming;
 b) means, coupled to the collector, for communicating event records to
 c) a merge processor for processing the event records to form a selected subscriber an event timeline describing the programming delivered to a selected subscriber over a particular time period via the media delivery network;
 d) means for storing demographics information about selected groups of subscribers; and
 e) wherein the merge processor forms a plurality of event timelines and correlates the demographics information with the event timelines.

14. A system according to claim 13 in which the merge processor applies filtering criteria to the event records to determine the programming watched by a subscriber for greater than a selected percent of the programming.

15. A system according to claim 14 in which the collector is deployed upon a set top box that is associated with a display device for displaying delivered programming.

16. A system according to claim 15 in which the subscriber controls the set top box via a remote device in order to invoke and run a variety of applications and the collector forms event records by:
 a) identifying a code that corresponds to a command of interest entered by a selected subscriber; and
 b) storing in a buffer, associated with the collector, an event record comprising
  (1) the code corresponding to the command; and
  (2) a time stamp.

* * * * *

US006983478C1

(12) INTER PARTES REEXAMINATION CERTIFICATE (836th)
United States Patent
Grauch et al.

(10) Number: US 6,983,478 C1
(45) Certificate Issued: Mar. 7, 2014

(54) METHOD AND SYSTEM FOR TRACKING NETWORK USE

(75) Inventors: Edward Rowland Grauch, Atlanta, GA (US); John Christopher Batten, San Jose, CA (US); Fred Thomas Danner, III, Colo. SP., CO (US); Scott R. Swix, Duluth, GA (US); John R. Stefanik, Atlanta, GA (US)

(73) Assignee: AT&T Intellectual Property I, L.P., Reno, NV (US)

Reexamination Request:
No. 95/000,601, Dec. 9, 2010

Reexamination Certificate for:
Patent No.: 6,983,478
Issued: Jan. 3, 2006
Appl. No.: 09/496,825
Filed: Feb. 1, 2000

Related U.S. Application Data

(63) Continuation of application No. 08/779,306, filed on Jan. 6, 1997, now abandoned.

(51) Int. Cl.
*H04H 60/33* (2008.01)
*G06Q 30/02* (2012.01)
*H04H 60/31* (2008.01)
*H04H 60/66* (2008.01)
*H04H 60/64* (2008.01)
*H04N 7/173* (2011.01)
*H04N 21/258* (2011.01)
*H04N 21/466* (2011.01)
*H04N 21/647* (2011.01)
*H04N 21/658* (2011.01)

(52) U.S. Cl.
CPC ............... *G06Q 30/02* (2013.01); *H04H 60/31* (2013.01); *H04H 60/66* (2013.01); *H04H 60/64* (2013.01); *H04N 7/17309* (2013.01); *H04N 21/25891* (2013.01); *H04N 21/4667* (2013.01); *H04N 21/64723* (2013.01); *H04N 21/6582* (2013.01)
USPC .............................. 725/13; 725/114; 725/131

(58) Field of Classification Search
None
See application file for complete search history.

(56) References Cited

To view the complete listing of prior art documents cited during the proceeding for Reexamination Control Number 95/000,601, please refer to the USPTO's public Patent Application Information Retrieval (PAIR) system under the Display References tab.

*Primary Examiner* — Mark Sager

(57) ABSTRACT

An interactive media delivery system enables interactive media programming to a multimedia device and also tracks a subscriber's use of the multimedia device. For example, the device tracks events, such as a change in programming, a change in channel selection, and/or the subscriber's interaction with a particular interactive services application. Each event may be stored as an event record in a database, and one or more of the event records may be merged with content data to form event timelines of programming or other activity to the multimedia device over a selected time period. Further, timelines may be analyzed to generate ratings and other information about programming and may also be correlated with demographics data for marketing analysis.

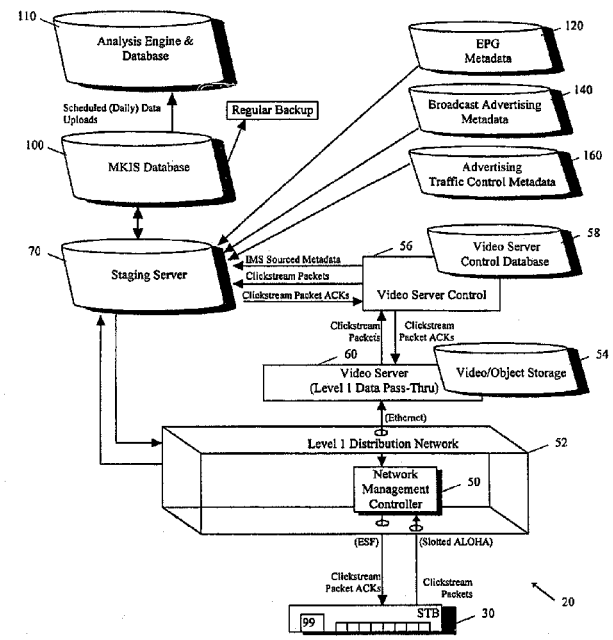

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-16 is confirmed.

\* \* \* \* \*